United States Patent

[11] 3,562,476

| [72] | Inventor | Gary F. Rupert<br>Ypsilanti, Mich. |
|---|---|---|
| [21] | Appl. No. | 715,888 |
| [22] | Filed | Mar. 25, 1968 |
| [45] | Patented | Feb. 9, 1971 |
| [73] | Assignee | Raycon Corporation<br>Ann Arbor, Mich.<br>a corporation of Michigan |

[54] ELECTRODE DEPTH OF TRAVEL CONTROL FOR ELECTRICAL DISCHARGE MACHINING APPARATUS
8 Claims, 5 Drawing Figs.

| [52] | U.S. Cl. | 219/69 |
|---|---|---|
| [51] | Int. Cl. | B23p 1/08 |
| [50] | Field of Search | 219/69 (C), 69 (G), 69 (E), 69 (F), 69 (S), 108, 109, 110, 68, 70; 77/32.9, 33.1 |

[56] References Cited
UNITED STATES PATENTS

| 2,778,925 | 1/1957 | Gross et al. | 219/69(E) |
|---|---|---|---|
| 2,980,787 | 4/1961 | Bruma | 219/69X(C) |

*Primary Examiner*—R. F. Staubly
*Attorney*—Olsen and Stephenson

ABSTRACT: An electromechanical control system for controlling the depth of travel of the electrode in the electrical discharge machining of through holes in workpieces. The control system prevents the possibility of shallow holes due to a foreshortened machining pass and also inhibits the unwanted machining of nearby surfaces caused by a machining pass which is too deep, by causing the tapered tip of the electrode to advance just far enough beyond breakthrough point to enable the unworn portion of the electrode to machine the hole to a uniform diameter. The control system responds to changes in the DC level of the filtered gap voltage (the voltage between electrode and workpiece) which occur while the tip of the electrode is breaking through the wall of the workpiece.

PATENTED FEB 9 1971  3,562,476

INVENTOR
GARY F. RUPERT

BY
Olsen and Stephenson
ATTORNEYS

ELECTRODE DEPTH OF TRAVEL CONTROL FOR ELECTRICAL DISCHARGE MACHINING APPARATUS

CROSS REFERENCE TO RELATED APPLICATION

The depth of travel control system of this invention is suitable for use in electrical discharge machining apparatus such as is shown in U.S. application Ser. No. 501,910, filed Oct. 22, 1965, and owned by the assignee of this application.

BACKGROUND OF THE INVENTION

Electrical discharge machining, or EDM, is a method of machining electrical current conducting materials, particularly metal, by utilizing the energy from an electrical discharge from an electrode to erode away the part being machined. During the process of drilling a microhole with a small diameter wire electrode using the EDM process, the tip of the electrode acquires a taper. If the tapered electrode tip is allowed to advance only to the point of breakthrough, the taper will produce a hole which is smaller in diameter at the breakthrough point (a shallow hole); however, the shallow hole at the breakthrough point can be largely eliminated by "sizing" the hole after breakthrough occurs. The sizing is accomplished by allowing the tip of the electrode to proceed far enough beyond the breakthrough point to permit the unworn portion of the electrode to machine the hole to a uniform diameter.

The conventional means of terminating the advance of the electrode is a limit switch which is actuated when the carriage supporting the electrode has traveled a predetermined distance toward the workpiece. The conventional depth control operates satisfactorily during the prebreakthrough machining passes and can also handle the final breakthrough and sizing pass on parts where the afterbreakthrough travel is not restricted by the physical configuration of the part itself. When machining holes into a closed cavity, however, the maximum afterbreakthrough travel may have to be limited to avoid machining the wall of the interior cavity opposite the hole; hence the depth control adjustment can be very critical for some types of small parts such as nozzles. When such parts are machined in large numbers, the variance in tolerances among the parts together with changes in other factors like the electrode wear or the condition of the dielectric makes it impossible to preset the depth control to properly machine all of the parts; hence a high scrappage rate results because many of the parts have shallow holes or unwanted machining on the opposite walls of the interior cavity.

The present invention seeks to overcome the problems of shallow holes and unwanted "opposite wall" machining which result when a conventional limit switch control system is used in applications where depth control is critical. The invention's close depth control is achieved through a closed-loop control system that responds to a change in the DC level of the filtered gap voltage which occurs as the electrode breaks through the wall of a workpiece into a different dielectric (air or oil) in the interior cavity. The electrode depth of travel is thus determined by a signal generated at the critical breakthrough point on each part; hence, the depth control assures a properly sized hole without opposite wall machining regardless of the variance in tolerances among the parts and the changes in electrode wear or in the dielectric properties of the coolant oil. No prior art is known which teaches this invention.

SUMMARY OF THE INVENTION

In EDM apparatus of the type to which this invention is applicable, a wire electrode is advanced axially toward the workpiece by a wheel driven by a motor. To assure a properly sized through hole without allowing an overtravel which might produce unwanted "opposite wall" machining, it is desirable that the machining pass be terminated immediately after the hole has been properly sized. To achieve this result, the gap voltage (between the energized electrode and the grounded workpiece) is tapped off and applied to a filter which converts the gap voltage's pulse train into a DC signal.

After breakthrough, there is a decrease in the number of short circuit paths between the electrode tip and the end wall of the hole being machined, away (and also between the electrode tip and machining particles which form a low voltage conductive path to the interior walls of the hole in the grounded workpiece). The decrease in the number of short circuit paths is caused by the dramatic improvement in machining conditions after breakthrough when the coolant oil flows freely through the breakthrough hole carrying away particles and other residue. Because of the better machining at breakthrough, the hole is quickly sized and the gap voltage rapidly rises toward the open-circuit voltage. However, as the amount of machining increases, the number of machining pulses occurring between the electrode and the grounded workpiece also increases tending to reduce the average value of the gap voltage. Thus, instead of rising instantaneously to the open-circuit voltage, the DC level of the filtered gap voltage rises toward the open-circuit voltage in a roughly linear manner during sizing of the hole. The output of the filter is applied to a DC level detector and switch that switches when the filtered DC signal approaches a predetermined level (which occurs upon the completion of sizing). When the level detector's switch fires, it turns off the motor switch which in turn shuts down the motor and stops the advance of the electrode immediately after the hole has been sized.

Further objects, features and advantages of this invention will become apparent from a consideration of the following description, the appended claims, and the accompanying drawing in which:

Figure 4:
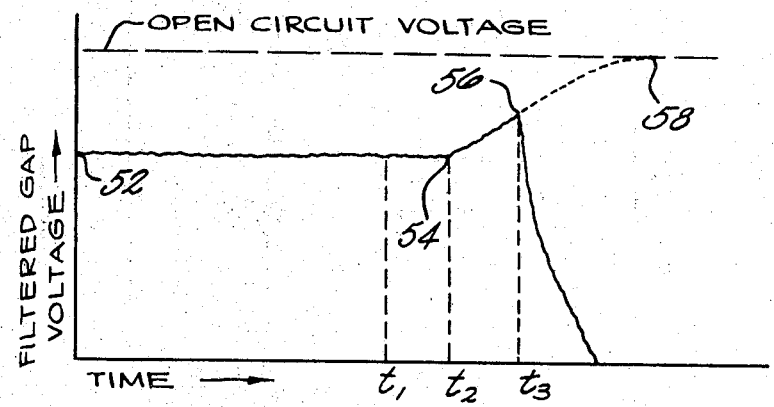
Figure 5:
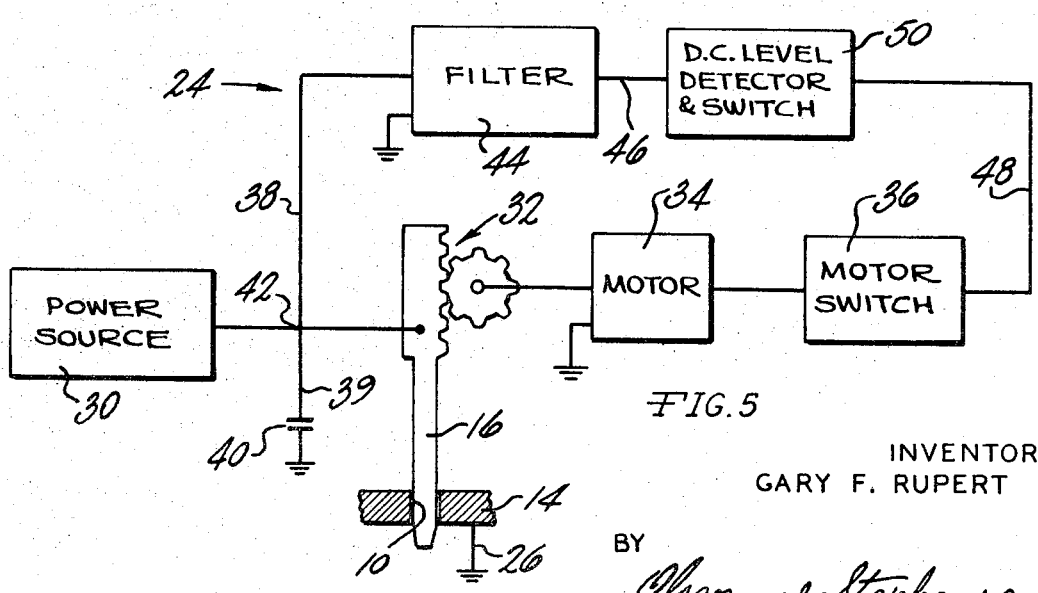

FIG. 4 is a graph of the output voltage of the filter in the apparatus of this invention as a function of time such as might be obtained from an oscilloscope tracing of the filtered gap voltage during prebreakthrough machining, breakthrough, and sizing; and FIG. 5 is a block diagram of the closed-loop control apparatus of this invention for controlling the depth of travel of the EDM electrode through a workpiece in the process of machining a through hole.

Figure 1:
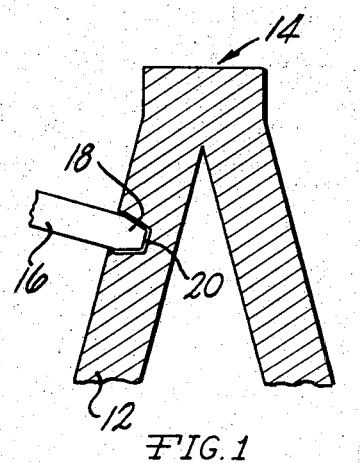
FIG. 1 is a sectional view of a small, closed-cavity workpiece, like a nozzle, illustrating an electrode in EDM apparatus in a position in which the electrode has partially formed a through hole in the nozzle.
Figure 2:
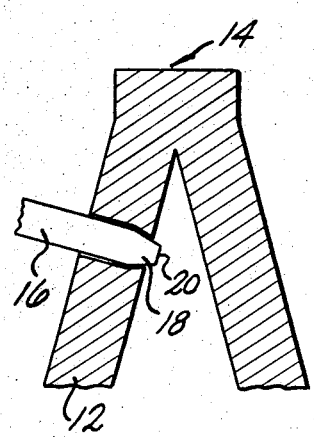
FIG. 2 is a sectional view like FIG. 1 showing the electrode in a position in which it has progressed into the workpiece far enough to produce breakthrough but not far enough to accomplish sizing of the hole.
Figure 3:
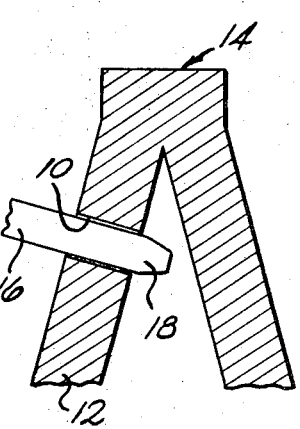
FIG. 3 is a sectional view like FIGS. 1 and 2 showing the electrode in a position in which it has sized the hole to a uniform diameter and further advance of the electrode has been terminated.

With reference to the drawing, a hole forming operation with the apparatus of this invention is illustrated somewhat diagrammatically in FIGS. 1—3, inclusive, wherein the forming of a through hole 10 in one wall 12 of a hollow workpiece 14 using an electrode 16 is shown. Initially, as the electrode 16 is advanced into the wall 12 so as to commence the eroding of the wall 12 to form the hole 10, the tip or end portion 18 of the electrode is also eroded away. Since the electrical field is strongest at the terminal end 20 of the electrode 16, the terminal end 20 has more sparks passing from it to the wall of the hole or to particles (trapped or in the process of escaping from the machining area near its terminal end 20) than from any other area of the electrode. Thus, the electrode's end portion 18 is eroded more than any other part of electrode 16 and hence acquires a tapered shape during the hole forming operation. During each hole forming operation a significant portion of the end of the electrode 16 will be eroded away so that it is necessary to feed more electrode forming wire after each hole forming operation to replenish the electrode 16, as explained in detail in the aforementioned copending application.

FIG. 1 is also illustrates the kind of incomplete through hole produced when the wire electrode 16 only partially penetrates the wall 12 because of a foreshortened machining pass; the foreshortened pass being the result of variance in the part and/or electrode wear for which a fixed distance limit switch depth control cannot compensate.

In FIG. 2, the terminal end 20 of the electrode 16 has advanced far enough to break through the wall 12 of the workpiece 14. However the tapered shape of tip 18 has produced a workpiece hole of nonuniform diameter which is undesirable.

Optimum depth of penetration is pictured in FIG. 3 in which the electrode 16 has penetrated just far enough through the wall 12 to cause the untapered portion 19 of the electrode 16 which follows the tapered tip 18 to machine the hole 10 to a uniform diameter without producing the unwanted machining of the opposite wall 22 in the workpiece 14.

The closed-loop depth control apparatus of this invention, indicated generally at 25 in FIG. 5, provides for automatic termination of the advancing movement of the electrode 16 when it reaches the position shown in FIG. 3. The apparatus 24 is adapted to be incorporated in the control circuit illustrated in the aforementioned copending application and is shown in a simplified diagrammatic form in FIG. 5 for the purpose of more particularly pointing out the invention. As shown in FIG. 5, the workpiece 14 is connected to a grounded conductor 26, and the electrode 16 is connected by a conductor 28 to an EDM power source 30 which can be of the type described in detail in the copending application. Drive apparatus, indicated generally at 32, is operable to advance the electrode 16 toward the workpiece 14 and retract the electrode 16 away from the workpiece so that it can be indexed for eroding another hole 10 therein or replaced by another workpiece which is to be similarly formed with holes. An electric motor 34 is connected to the apparatus 32 for operating it and a motor switch 36 is connected to the motor 34 for turning it off to terminate the advance of electrode 16 through workpiece 14.

A conductor 39 is connected to a grounded condenser 40, and is also connected (at junction point 42) to a conductor 38 which is also connected to a conventional filter 44. The gap voltage between the electrode 16 (energized by the EDM power source 30) and the grounded workpiece 14 is tapped off at the junction point 42 and applied to the filter 44 to convert the gap voltage pulse train into a DC level output voltage in a conductor 46 connected to the filter 44. The filter 44 functions to provide an output signal in conductor 46 which represents an average gap voltage over a small time period. A DC level detector and switch circuit 50 is connected to the filter's output conductor 46 and is also connected to the motor switch 36 by a conductor 48. The circuit 50 is of well known construction and can be preset to trigger at a certain voltage level. When the circuit 50 triggers, it actuates the motor switch 36 to turn off the motor 34 to thereby terminate the forward movement of the electrode 16.

In the operation of the apparatus 24, first assume that the motor 34 is operating the drive apparatus 32 to advance the electrode 16 which has progressed into the workpiece wall 12 as shown in FIG. 1.

Virtually all machining is done by discharges between the tapered tip 18 of electrode 16 and the surfaces of the hole in the workpiece wall 12 which are directly opposite the tapered tip 18. As the electrode 16 advances on a machining pass toward the end of the hole in workpiece wall 12, the voltage between electrode 16 and the workpiece wall 12 which is grounded goes through three phases: first, when the electrode 16 is too far from the end of the hole the gap voltage is equal to the open-circuit voltage between the electrode and the grounded workpiece 14; second, as the electrode gets closer to the end of the hole discharges between the tapered tip 18 of the electrode and the opposite surfaces of the hole in workpiece wall 12 take place; it is these discharges which do the actual machining of the hole in workpiece wall 12; finally, the tip 20 of electrode 16 comes into physical contact with the end of the hole in workpiece wall 12 (or into contact with metal particles which have been dislodged during machining from the workpiece or the electrode and which are themselves in contact with the end of the hole in the workpiece wall 12) producing a short circuit condition between electrode 16 and workpiece wall 12 which is grounded. The percentage of time on any machining pass during which electrode 16 is shorted to workpiece wall 12 is determined by adjusting the feed rate of electrode 16 toward workpiece 14. Thus, the feed rate of electrode 16 also determines the DC level of the filtered gap voltage (between electrode 16 and grounded workpiece 14) as shown in FIG. 4. Since the electrode 16 is advanced at a predetermined feed rate and encounters relatively uniform dielectric conditions during the prebreakthrough machining passes, the gap voltage pulse train and hence the filtered gap voltage DC level remains relatively constant during prebreakthrough machining as is shown between points 52 and 54 on the filtered gap voltage versus time diagram illustrated in FIG. 4.

At breakthrough, however, two distinct changes in the nature of the machining take place. First, the efficiency of the dielectric flushing fluid improves because of the direct flow of fluid through the hole. This reduces the possibilities of shorting of electrode tip 18 via particles in the hole; second, the tip 18 of electrode 16 a has a gradually lessened chance of shorting out against the end of the hole because the end of the hole is being machined away during the sizing operation and this machining is taking place at an increased rate because of the improved dielectric conditions after breakthrough). Since the amount of shorting of the tip 18 occurring after breakthrough and during sizing is drastically reduced, the average or DC level of the gap voltage tends to rise almost instantaneously to the open circuit voltage. However the dramatic increase in the number of machining pulses after breakthrough tends to lower the average value of the gap voltage. The result is a roughly linear increase in the DC level of the filtered gap voltage as shown between points 54 and 56 on the graph in FIG. 4. The ramp voltage between points 54 and 56 is used to trigger a DC level detector at the appropriate time so that the machining pass is terminated immediately after sizing.

The filtered gap voltage shown in FIG. 4 is obtained as an output from filter 44 via conductor 46. When the voltage in conductor 46 has risen to the point indicated at 56 in the graph in FIG. 4, the tapered tip 18 of the electrode 16 has traveled completely through the workpiece wall 12 so that sizing of the hole 10 has been completed. In other words, the hole 10 is now of a substantially uniform diameter. Since the machining pass is terminated at point 56 and the power applied to electrode 16 is cut off, the filtered gap voltage after point 56 drops off quickly to zero. It may be noted, however, that if the power to electrode 16 were not cut off at point 56 and the machining pass were allowed to continue, the conductor 46 voltage would continue to increase between points 56 and 58 and would approach the open-circuit voltage between the electrode 16 and the hole 10 near point 58. It is desirable to terminate the sizing of hole 10 when the electrode 16 is in approximately the position shown in FIG. 3. In some cases it is desirable to control the location of this position very closely, such as when the opposite wall of the workpiece is very close to the exit end of hole 10. If the opposite wall is not so close, it might be desirable to provide for additional electrode travel before terminating advancing movement in order to assure proper hole sizing. In other cases it may be desirable to terminate electrode travel earlier and run the risk of some shallow holes. The filter 44 introduces a small time delay between the movement of the electrode 16 and the sensing of the gap voltage by the DC level detector and switch 50. Thus, when point 54 is reached on the FIG. 4 graph, at time $t_2$, indicating breakthrough of the electrode, from an actual time standpoint, breakthrough actually took place at time $t_1$, with $t_2 - t_1$ representing the filter delay time. When the voltage level indicated at point 56 on the graph is reached, the level detector 50 switches to terminate electrode travel. In point of time, the switching point $t_3$ occurs after the apparent breakthrough point $t_2$ and corresponds to the time at which the electrode is actually in the FIG. 3 position so that sizing has been accomplished. Switching point 56 can be adjusted within limits to vary the amount of electrode travel after breakthrough.

When the DC level detector and switch 50 fires, it turns off the motor switch 46 which in turn shuts off the motor 34, stopping the operation of drive mechanism 32 and terminating the advance of the electrode 16. Electrode 16 is then retracted from the workpiece 14 by a suitable mechanism which forms no part of this invention. After retraction, the workpiece 14 is either indexed for another hole forming operation or removed and replaced with another workpiece 14 and above cycle is repeated.

Although the particular electrode position sensing mechanism disclosed herein involves detection of the gap voltage, the gap current and the frequency of discharges in the gap also change along with the voltage after breakthrough and during sizing since these parameters are functions of the gap voltage and it is within the purview of this invention to also detect these changes and similarly terminate electrode advance in response to one of these signals. Gap voltage gap current and frequency of discharge in the gap are referred to collectively hereinafter as parameters which are functions of the gap impedance.

It will be understood that the depth control method and apparatus which are herein disclosed and described are presented for the purposes of explanation and illustration and are not intended to indicate the limits of the invention, the scope of which is defined by the following claims.

I claim:

1. In electrical discharge machining apparatus for forming uniform diameter through holes in workpieces wherein said apparatus includes an electrode of substantially uniform diameter having a tip and means for advancing said electrode tip first toward and through a workpiece, the improvement comprising means operatively associated with said advancing means for sensing the position of said electrode tip relative to said work by detecting a parameter which is a function of impedance across the gap between said electrode and the workpiece, and means responsive to a signal from said sensing means indicating that said tip has traveled substantially completely through a workpiece for actuating said advancing means to terminate advancing movement of said electrode.

2. Apparatus according to claim 1 wherein said means for sensing the position of said electrode tip comprises means for sensing a signal which is a function of the voltage across the gap between said electrode and the workpiece.

3. Apparatus according to claim 2 further including voltage filtering means connected to said electrode and operable to filter said gap voltage signal and convert it to a substantially DC voltage, and means connected to said filtering means operable to detect the voltage level of the output thereof.
5.

4. Apparatus according to claim 3 wherein said last mentioned means is a voltage level detector operable to trigger at a preset voltage level corresponding substantially to the level existing at the time said tip has traveled completely through a workpiece.

5. Apparatus according to claim 4 further including switch means connected to said voltage level detector and operable on triggering of said voltage level detector to terminate operation of said means for advancing said electrode.

6. The method of forming a through hole of uniform diameter in a metal workpiece by an electrical discharge machining process comprising the steps of:
   a. providing an; electrode having a tip;
   b. advancing said electrode tip first through said workpiece;
   c. sensing the position of said tip relative to said workpiece by detecting a parameter which is a function of impedance across the gap between said electrode and the workpiece; and
   d. terminating the advance of said electrode responsively to sensed change in said parameter when said tip has traveled completely through the workpiece.

7. The method according to claim 6 wherein said sensing step includes the step of sensing a signal which is a function of the gap voltage between said electrode and said workpiece.

8. The method according to claim 7 further including the steps of:
   a. filtering said gap voltage signal to obtain a substantially DC voltage; and
   b. sensing the level of the filtered gap voltage.